(12) United States Patent
Zhao

(10) Patent No.: US 9,960,617 B2
(45) Date of Patent: May 1, 2018

(54) MOBILE TERMINAL WITH MULTI-PORT CHARGING CONTROL FUNCTION

(71) Applicant: HUIZHOU TCL MOBILE COMMUNICATION CO., LTD., Huizhou (CN)

(72) Inventor: Shiqing Zhao, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 408 days.

(21) Appl. No.: 14/419,111

(22) PCT Filed: Aug. 7, 2013

(86) PCT No.: PCT/CN2013/080957
§ 371 (c)(1),
(2) Date: Feb. 2, 2015

(87) PCT Pub. No.: WO2014/173037
PCT Pub. Date: Oct. 30, 2014

(65) Prior Publication Data
US 2015/0180254 A1  Jun. 25, 2015

(30) Foreign Application Priority Data

Apr. 24, 2013  (CN) .......................... 2013 1 0144667

(51) Int. Cl.
*H02J 7/00* (2006.01)
*G06F 1/26* (2006.01)

(52) U.S. Cl.
CPC .............. *H02J 7/0052* (2013.01); *G06F 1/26* (2013.01); *G06F 1/263* (2013.01); *H02J 7/008* (2013.01);

(Continued)

(58) Field of Classification Search
CPC ........ H02J 7/008; H02J 7/0052; H02J 7/0072; G06F 1/26; G06F 1/263

(Continued)

(56) References Cited

U.S. PATENT DOCUMENTS

| 2009/0200982 A1* | 8/2009 | Hurtz ................... G06F 1/3203 320/103 |
| 2012/0217924 A1* | 8/2012 | Bayne ...................... G06F 1/26 320/107 |

FOREIGN PATENT DOCUMENTS

| CN | 200994072 Y | 12/2007 |
| CN | 201167243 Y | 12/2008 |

(Continued)

*Primary Examiner* — Edward Tso
*Assistant Examiner* — Aaron Piggush
(74) *Attorney, Agent, or Firm* — Shimokaji & Associates, P.C.

(57) ABSTRACT

A mobile terminal includes a battery; a first universal serial bus (USB) interface, a central processing unit (CPU), a USB charging management module, and a charging management chip. The central processing unit (CPU) is configured to generate an on/off command, and configured to output an adjustment signal. The USB charging management module is configured to turn on or off a charging channel according to the on/off command, and configured to control a value of a charging current according to the adjustment signal, combine the charging current, and transmit the combined charging current to a charging management chip. The charging management chip is configured to transmit the charging current to the battery to charge the battery.

16 Claims, 3 Drawing Sheets

(52) U.S. Cl.
CPC ..... *H02J 7/0072* (2013.01); *H02J 2007/0001* (2013.01); *H02J 2007/0062* (2013.01)

(58) Field of Classification Search
USPC ........................................ 320/107, 134, 164
See application file for complete search history.

(56) References Cited

FOREIGN PATENT DOCUMENTS

| | | |
|---|---|---|
| CN | 101359836 A | 2/2009 |
| CN | 103219770 A | 7/2013 |

\* cited by examiner

MOBILE TERMINAL WITH MULTI-PORT CHARGING CONTROL FUNCTION

TECHNICAL FIELD

The present disclosure relates to the field of charging technologies, and more particularly, relates to a mobile terminal with a multi-port charging control function.

BACKGROUND

Smart phones, tablet computers and other mobile terminals, with their powerful functions and convenience, play an important role in people's work and life. It can be seen from current development trends of mobile terminals that smart terminals have increasingly larger display screens, more powerful functions, and a higher processing speed, and support multiple universal serial bus (USB) interfaces. These developments often cause the mobile terminals to consume more power. In order to extend standby time of mobile terminals, a method of increasing battery capacity is often adopted. However, due to an increase in the battery capacity, in order to ensure that the charging time is not changed, it is necessary to increase a charging current, which inevitably puts forward a higher requirement on a charging system.

At present, low-energy mobile phones or tablet computers are charged mainly through a single interface. Electrical current, carried by a USB interface, is typically designed according to a USB interface industry standard, and a nominal current (i.e., charging current) is often required to be 500 mA. The typical charging ability, of a standard USB interface, is far from meeting the requirements for large battery capacity and a same or shorter charging time of the ever-growing mobile terminals. More and more mobile terminals require charging currents much higher than the electrical current provided by a standard USB. Therefore, a large-current charging device, and stable power supply, for smart terminals is desirable.

There are generally three charging methods for mobile terminals. The first method of charging is through a USB interface, which is typically only suitable for small-current charging, and charging time is prolonged if battery capacity of a mobile terminal is large. The second charging method employs a DC charging stand. DC charging stands are typically non-standard, and need a special DC charging interface. Use of USB interfaces, with non-standard DC charging interfaces, leads to an increase in a number of special accessories of the required for a mobile terminal, thereby greatly increasing the cost, and resulting in poor user experience. The third charging method is hybrid charging using a USB interface for small-current charging, and using a special DC charging interface for large-current charging. Hybrid charging typically has high requirements for control over values of currents, combination of large and small currents, and compatibility of the USB interface, and typically has a high cost.

Therefore, the prior art remains to be improved and enhanced.

SUMMARY

In view of the deficiencies of the prior art, a mobile terminal with a multi-port charging control function is provided, so as to solve the problems of long charging time of a battery and poor compatibility of USB interfaces.

In order to achieve the foregoing objective, the present invention uses the following technical solutions:

A mobile terminal includes a battery; a USB interface; a central processing unit (CPU); a charging management chip; and a USB charging management module, where the USB charging management module is configured to output a corresponding detection voltage according to charger connection conditions of the USB interface; configured to turn on or off a charging channel of the corresponding USB interface according to an on/off command output by the CPU; and configured to, when the charging channel is turned on, control a value of a charging current according to an adjustment signal sent by the CPU, combine the charging current, and transmit the combined charging current to the charging management chip; the CPU is configured to identify the charger connection conditions of the USB interface according to the detection voltage and output the corresponding on/off command, and configured to acquire the value of the charging current and output the adjustment signal to the USB charging management module; the charging management chip is configured to transmit the charging current output by the USB charging management module to the battery to charge the battery, where the battery is connected to the USB charging management module through the charging management chip, and both the USB interface and the CPU are connected to the USB charging management module; at least one USB interface is provided; and the number of the charger detection modules, the number of the charging current control modules, and the number of the data processing modules are the same as the number of the USB interfaces.

In another embodiment of a mobile terminal, a USB charging management module includes a charger detection module, configured to detect whether a charger is connected to the USB interface, and output the detection voltage to the CPU; a charging current control module, configured to turn on or off the charging channel according to the on/off command, and configured to control the value of the charging current according to the adjustment signal; a data processing module, configured to perform anti-interference and anti-static processing on USB data transmitted by the CPU; and a current combiner, configured to combine the charging current, and transmit the charging current to the charging management chip, where the charger detection module, the charging current control module and the data processing module are all connected to the USB interface and the CPU, and the charging current control module is connected to the charging management chip through the current combiner.

In a further embodiment of a mobile terminal, a USB interface includes a first USB interface and a second USB interface; a charger detection module includes a first charger detection module and a second charger detection module; a charging current control module includes a first charging current control module and a second charging current control module; a data processing module includes a first data processing module and a second data processing module; the first charger detection module, the first charging current control module and the first data processing module are connected to the first USB interface and the CPU; the second charger detection module, the second charging current control module and the second data processing module are connected to the second USB interface and the CPU; and the first charging current control module and the second charging current control module are connected to the current combiner.

In yet another embodiment of a mobile terminal, a first charger detection module includes a first resistor, a second resistor, a third resistor and a first transistor; a first charging current control module includes a fourth resistor, a fifth resistor, a second transistor and a first capacitor; a first data processing module includes a first common-mode suppression coil, a first transient voltage suppressor (TVS) tube, a second TVS tube and a third TVS tube; a second charger detection module includes a sixth resistor, a seventh resistor, an eighth resistor and a third transistor; a second charging current control module includes a ninth resistor, a tenth resistor, a fourth transistor and a second capacitor; and a second data processing module includes a second common-mode suppression coil, a fourth TVS tube, a fifth TVS tube and a sixth TVS tube.

In yet a further embodiment of a mobile terminal, a base of the first transistor is connected to a power source end of the first USB interface and an emitter of the second transistor through the first resistor, a base of the first transistor is further grounded through the second resistor, a collector of the first transistor is connected to the CPU and is further connected to a power source end through the third resistor, and an emitter of the first transistor is grounded; the emitter of the second transistor is connected to the power source end of the first USB interface, the emitter of the second transistor is grounded through the first capacitor, and a base of the second transistor is connected to the CPU through the fourth resistor; a first end of the first common-mode suppression coil is connected to a positive data line end of the first USB interface and an anode of the third TVS tube, a second end of the first common-mode suppression coil is connected to the CPU, a third end of the first common-mode suppression coil is connected to a negative data line end of the first USB interface and an anode of the second TVS tube, and a fourth end of the first common-mode suppression coil is connected to the CPU; an anode of the first TVS tube is connected to an identification end of the first USB interface and the CPU; and a cathode of the first TVS tube, a cathode of the second TVS tube and a cathode of the third TVS tube are all grounded.

In another embodiment of a mobile terminal, a base of the third transistor is connected to a power source end of the second USB interface and an emitter of the fourth transistor through the sixth resistor, a base of the third transistor is further grounded through the seventh resistor, a collector of the third transistor is connected to the CPU and is further connected to a power source end through the eighth resistor, and an emitter of the third transistor is grounded; an emitter of the fourth transistor is grounded through the second capacitor, and a base of the fourth transistor is connected to the CPU through the ninth resistor; a first end of the second common-mode suppression coil is connected to a positive data line end of the second USB interface and an anode of the sixth TVS tube, a second end of the second common-mode suppression coil is connected to the CPU, a third end of the second common-mode suppression coil is connected to a negative data line end of the first USB interface and an anode of the fifth TVS tube, and a fourth end of the second common-mode suppression coil is connected to the CPU; an anode of the fourth TVS tube is connected to an identification end of the second USB interface and the CPU; and a cathode of the fourth TVS tube, a cathode of the fifth TVS tube and a cathode of the sixth TVS tube are all grounded.

In a further embodiment, a mobile terminal, includes a battery; a USB interface; a CPU; a charging management chip; and a USB charging management module, where the USB charging management module is configured to output a corresponding detection voltage according to charger connection conditions of the USB interface, configured to turn on or off a charging channel of the corresponding USB interface according to an on/off command output by the CPU, and configured to, when the charging channel is turned on, control a value of a charging current according to an adjustment signal sent by the CPU, combine the charging current, and transmit the combined charging current to the charging management chip; the CPU is configured to identify the charger connection conditions of the USB interface according to the detection voltage and output the corresponding on/off command, and configured to acquire the value of the charging current and output the adjustment signal to the USB charging management module; the charging management chip is configured to transmit the charging current output by the USB charging management module to the battery to charge the battery; the battery is connected to the USB charging management module through the charging management chip, and both the USB interface and the CPU are connected to the USB charging management module.

In yet another embodiment of a mobile terminal, a USB charging management module includes a charger detection module, configured to detect whether a charger is connected to the USB interface, and output the detection voltage to the CPU; a charging current control module, configured to turn on or off the charging channel according to the on/off command, and configured to control the value of the charging current according to the adjustment signal; a data processing module, configured to perform anti-interference and anti-static processing on USB data transmitted by the CPU; and a current combiner, configured to combine the charging current, and transmit the charging current to the charging management chip.

In yet a further embodiment of a mobile terminal, a charger detection module, a charging current control module, and a data processing module are all connected to a USB interface and a CPU, and the charging current control module is connected to a charging management chip through a current combiner.

In another embodiment of a mobile terminal, a USB interface includes a first USB interface and a second USB interface; and a charger detection module includes a first charger detection module and a second charger detection module; a charging current control module includes a first charging current control module and a second charging current control module; and a data processing module includes a first data processing module and a second data processing module.

In a further embodiment of a mobile terminal, a first charger detection module, a first charging current control module and a first data processing module are connected to a first USB interface and a CPU; a second charger detection module, a second charging current control module and a second data processing module are connected to a second USB interface and the CPU; and the first charging current control module and the second charging current control module are connected to the current combiner.

In yet another embodiment of a mobile terminal, a first charger detection module includes a first resistor, a second resistor, a third resistor and a first transistor; a first charging current control module includes a fourth resistor, a fifth resistor, a second transistor and a first capacitor; and a first data processing module includes a first common-mode suppression coil, a first TVS tube, a second TVS tube and a third TVS tube.

In yet a further embodiment of a mobile terminal, a base of a first transistor is connected to a power source end of a first USB interface and an emitter of a second transistor through a first resistor, a base of the first transistor is further grounded through a second resistor, a collector of the first transistor is connected to a CPU and is further connected to a power source end through a third resistor, and an emitter of the first transistor is grounded; and the emitter of the second transistor is connected to the power source end of the first USB interface, the emitter of the second transistor is grounded through a first capacitor, and a base of the second transistor is connected to the CPU through a fourth resistor.

In another embodiment of a mobile terminal, a first end of a first common-mode suppression coil is connected to a positive data line end of a first USB interface and a anode of a third TVS tube, a second end of a first common-mode suppression coil is connected to a CPU, a third end of the first common-mode suppression coil is connected to a negative data line end of the first USB interface and an anode of a second TVS tube, and a fourth end of the first common-mode suppression coil is connected to the CPU; an anode of a first TVS tube is connected to an identification end of the first USB interface and the CPU; and a cathode of the first TVS tube, a cathode of the second TVS tube and a cathode of the third TVS tube are all grounded.

In a further embodiment of a mobile terminal, a first transistor is an NPN transistor.

In a further embodiment of a mobile terminal, a second charger detection module includes a sixth resistor, a seventh resistor, an eighth resistor and a third transistor; a second charging current control module includes a ninth resistor, a tenth resistor, a fourth transistor and a second capacitor; and a second data processing module includes a second common-mode suppression coil, a fourth TVS tube, a fifth TVS tube and a sixth TVS tube.

In yet another embodiment of a mobile terminal, a base of a third transistor is connected to a power source end of a second USB interface and an emitter of a fourth transistor through a sixth resistor, a base of the third transistor is further grounded through a seventh resistor, a collector of the third transistor is connected to a CPU and is further connected to a power source end through an eighth resistor, and an emitter of a third transistor is grounded; and an emitter of a fourth transistor is grounded through a second capacitor, and a base of a fourth transistor is connected to the CPU through a ninth resistor.

In yet a further embodiment of a mobile terminal, a first end of the second common-mode suppression coil is connected to a positive data line end of a second USB interface and a anode of a sixth TVS tube, a second end of the second common-mode suppression coil is connected to a CPU, a third end of the second common-mode suppression coil is connected to a negative data line end of a first USB interface and an anode of a fifth TVS tube, and a fourth end of the second common-mode suppression coil is connected to the CPU; an anode of a fourth TVS tube is connected to an identification end of the second USB interface and the CPU; and a cathode of the fourth TVS tube, a cathode of the fifth TVS tube and a cathode of the sixth TVS tube are all grounded.

In another embodiment of a mobile terminal, a second transistor is a PNP transistor.

In a further embodiment of a mobile terminal, a current combiner includes an eleventh resistor; one end of a fifth resistor is connected to a CPU and a collector of a second transistor, and another end of the fifth resistor is connected to the CPU and one end of the eleventh resistor; and one end of a tenth resistor is connected to the CPU and a collector of a fourth transistor, and another end of a tenth resistor is connected to the CPU and one end of the eleventh resistor.

A mobile terminal, with a multi-port charging control function, is provided where, during charging, a USB charging management module detects charger connection conditions of a USB interface to output a corresponding detection voltage to a CPU so that the CPU identifies a charger connection state of a USB interface; the CPU outputs a corresponding on/off command to turn on/off a charging channel of the corresponding USB interface, and when a charging channel is turned on, controls a value of a charging current, combines a charging current, and transmits a combined charging current to a charging management chip to charge a battery. A requirement for large-current charging is met by using multiple USB interfaces in parallel for charging, which greatly reduces charging time of a battery, is easy to operate, and has a low cost.

DETAILED DESCRIPTION

A mobile terminal may be provided with multiple USB interfaces, and when a USB charger is connected to a USB interface, a VBUS end (power source end) of the USB interface generates a voltage of +5V, where with a nominal current of 500 mA. A DM end of the USB interface may be a positive data line end, a DP end may be a negative data line end, an ID end may be an identification end, and a GND end may be a ground end.

In order to improve charging efficiency, the mobile terminal with a multi-port charging control function, may be provided that may use existing multiple USB interfaces for parallel charging. During charging, the USB interfaces may be independent of each other and may be comprehensively managed by the CPU. The CPU may monitor a charging state of each USB interface separately, including USB charger connection detection, on/off of the charging channel, control over a value of a charging current, combination of multiple charging currents and the like. The multiple USB interfaces may be equivalent to a building-block charging interface, and the number of chargers connected to the USB interfaces can be arbitrarily increased or decreased.

In order to make the objective, technical solutions and effects clearer, mobile terminals, with multi-port charging control functions, are in detail with reference to the accompanying drawings and exemplary embodiments. It should be understood that, the exemplary embodiments are for illustrative purposes and are not to limit the scope of the appending claims in any way.

Figure 1:
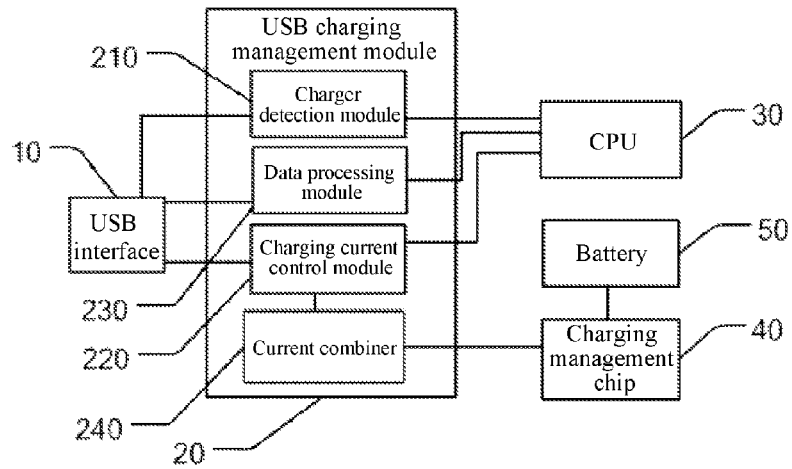
FIG. 1 depicts a structural block diagram of a mobile terminal with a multi-port charging control function according to the present invention.

Referring to FIG. 1, a structural block diagram of a mobile terminal, with a multi-port charging control function, is depicted. The mobile terminal may include a USB interface 10, a USB charging management module 20, a CPU 30, a charging management chip 40 and a battery 50. The battery 50 may be connected to the USB charging management module 20 through the charging management chip 40, and both the USB interface 10 and the CPU 30 may be connected to the USB charging management module 20. The USB charging management module 20 may output a corresponding detection voltage to the CPU 30 according to charger connection conditions of the USB interface. The CPU 30 may identify the charger connection conditions of the USB interface according to the detection voltage and may output a corresponding on/off command to the USB charging management module 20. The USB charging management module 20 may turn on/off a charging channel of the corresponding USB interface according to the on/off command, and when the charging channel is turned on, may control a value of a charging current according to an adjustment signal, may combine the charging current, and then may transmit the combined charging current to the charging management chip 40 to charge the battery 50. The USB charging management module 20 may include a charger detection module 210, a charging current control module 220, a data processing module 230 and a current combiner 240. The charger detection module 210, the charging current control module 220 and the data processing module 230 may be connected to the USB interface 10 and the CPU 30, and the charging current control module 220 may be connected to the charging management chip 40 through the current combiner 240. The charger detection module 210 may detect whether a charger is connected to the USB interface 10 of the mobile terminal, and may output the corresponding detection voltage to the CPU 30. The charging current control module 220 may turn on/off the charging channel of the corresponding USB interface 10 according to the on/off command transmitted by the CPU 30; when the charging channel is turned on, the CPU 30 may acquire the value of the charging current and may output a corresponding adjustment signal to the USB charging management module to adjust the value of the charging current. The current combiner 240 may combine the charging current output by the charging current control module 220 and then may transmit the charging current to the charging management chip 40. The data processing module 230 may perform anti-interference and anti-static processing on USB data transmitted by the CPU.

Figure 2:
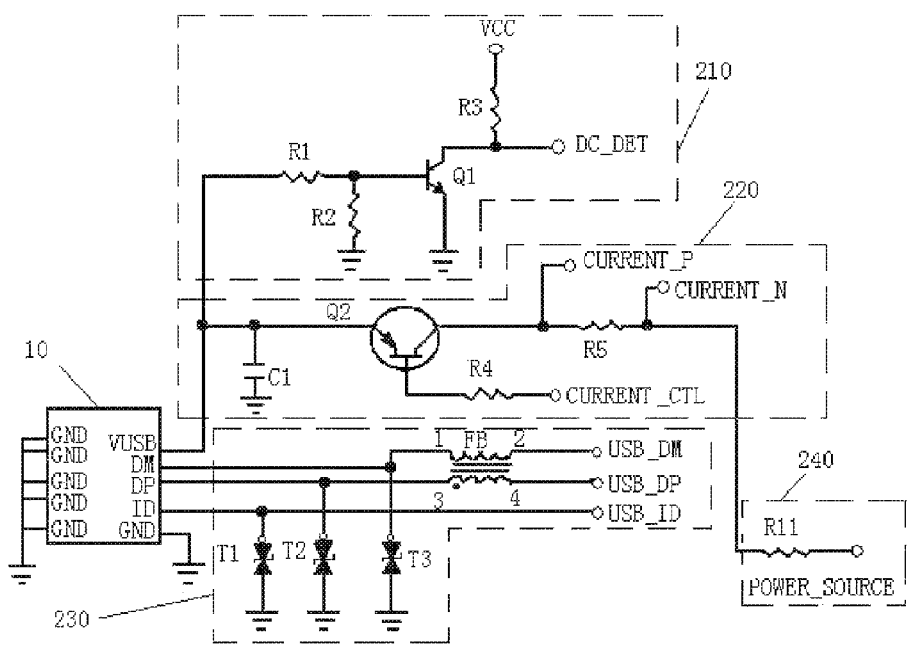
FIG. 2 depicts a circuit diagram of a USB charging management module in a mobile terminal with a multi-port charging control function according to the present invention.

Referring to FIG. 2, a circuit diagram of a USB charging management module, in a mobile terminal with a multi-port charging control function, is depicted. As shown in FIG. 2, a charger detection module 210 may include a first resistor R1, a second resistor R2, a third resistor R3 and a first transistor Q1. A base of the first transistor Q1 may be connected to a VUSB end of the USB interface 10 through the first resistor R1, a base of the first transistor Q1 may be further grounded through the second resistor R2, a collector of the first transistor Q1 may be connected to the CPU 30 and may be further connected to a power source end VCC through the third resistor R3, and an emitter of the first transistor Q1 may be grounded. When no charger is connected to the USB interface 10, a VUSB end may be suspended, and a DC_DET signal output by the collector of the first transistor Q1 may be pulled up to a high level by the third resistor R3.

The first transistor Q1 may be an NPN transistor. When detecting that the DC_DET signal is at a high level, the CPU 30 may identify that no charger is connected to the USB interface; it is unnecessary to turn on the charging channel corresponding to the USB interface, and the CPU 30 may output an off command to the charging current control module 220. When a charger is connected to the USB interface, the VUSB end may output a nominal voltage of 5V to turn on the first transistor Q1, and the DC_DET signal output by the collector may be pulled down from a high level to a low level. When detecting that the DC_DET signal is at a low level, the CPU 30 may identify that a charger is connected to the USB interface; at this time, it may be necessary to turn on the charging channel corresponding to the USB interface for charging, and the CPU 30 outputs an on command to the charging current control module 220. The first resistor R1 may be a current-limiting resistor, the second resistor R2 may be a pull-down protection resistor, and the two may be combined to protect the first transistor Q1 from being damaged by a large current.

The charging current control module 220 may include a fourth resistor R4, a fifth resistor R5, a second transistor Q2 and a first capacitor C1. A base of the second transistor Q2 may be connected to the CPU 30 through the fourth resistor R4, and an emitter of the second transistor Q2 may be connected to the VUSB end of the USB interface 10 and may be further grounded through the first capacitor C1. One end of the fifth resistor R5 may be connected to the CPU 30 and a collector of the second transistor Q2, and the other end of the fifth resistor R5 may be connected to the CPU 30 and the current combiner 240. The second transistor Q2 may be a high-power PNP transistor. When identifying that a charger is connected to the USB interface 10, the CPU 30 may output a low-level CURRENT_CTL signal which may be input to a base of the second transistor Q2 through the fourth resistor R4, to turn on the second transistor Q2, and a current from the VUSB end of the USB interface 10 may flow through the fifth resistor R5. At this time, one end of the fifth resistor R5 may output a CURRENT_P signal (i.e., one charging signal, expressed in the form of a voltage value) to the CPU 30, and another end of the fifth resistor R5 may output a CURRENT_N signal (i.e., another charging signal, expressed in the form of a voltage value) to the CPU 30. A resistance value of the fifth resistor R5 may be a known fixed value, and the CPU 30 can calculate the value of the charging current according to a voltage difference between a CURRENT_P signal and a CURRENT_N signal and a resistance value of the fifth resistor R5. Generally, a charging current generated may be 500 mA, which may be the nominal current, and in the subsequent charging process, the CPU 30 may output CURRENT_P signals at different levels according to the battery level, to adjust a turn-on degree of the second transistor Q2. Thereby, a value of the charging current may be adjusted, which may prevent a battery from being damaged by an excessively large charging current when the battery is about to be fully charged, and can further ensure stability of the charging process. The first capacitor C1 may be used for energy storage and denoising during charging, to ensure stability of the charging current.

The data processing module 230 may include a common-mode suppression coil FB for anti-interference, and a first TVS tube T1, a second TVS tube T2 and a third TVS tube T3 for anti-static processing. A first end 1 of the common-mode suppression coil FB may be connected to a DM end of the USB interface 10 and an anode of the third TVS tube T3; a second end 2 of the common-mode suppression coil FB may be connected to the CPU 30, and may be configured to transmit a USB_DM signal (positive data); a third end 3 of the common-mode suppression coil FB may be connected to a DP end of the USB interface 10 and an anode of the second TVS tube T2; a fourth end 4 of the common-mode suppression coil FB may be connected to the CPU 30, and is configured to transmit a USB_DP signal (negative data). An anode of the first TVS tube T1 may be connected to an ID end of the USB interface 10 and the CPU 30, and may be configured to transmit a USB_ID signal (identity authentication information); and a cathode of the first TVS tube T1, a cathode of the second TVS tube T2 and a cathode of the third TVS tube T3 may be grounded.

The current combiner 240 may include a current combining resistor R11, one end of the current combining resistor R11 may be connected to the other end of the fifth resistor R5 of the charging current control module 220, and the other end of the current combining resistor R11 may be connected to the charging management chip 40. After flowing through the current combining resistor R11, charging currents output by the fifth resistor R5 may form a total charging current POWER_SOURCE, which may be transmitted to the charging management chip 40 for processing, and then may be used to charge the battery. One USB interface 10 may be adaptive to one charger detection module 210, one charging current control module 220 and one data processing module 230. If there are multiple USB interfaces 10, there may be a same number of charger detection modules 210, charging current control modules 220 and data processing modules 230 correspondingly. At this time, the current combiner 240 may combine charging currents generated by multiple charging current control modules 220 to form an ultimate large total charging current, and then the battery 50 may be charged by the charging management chip 40.

Figure 3:
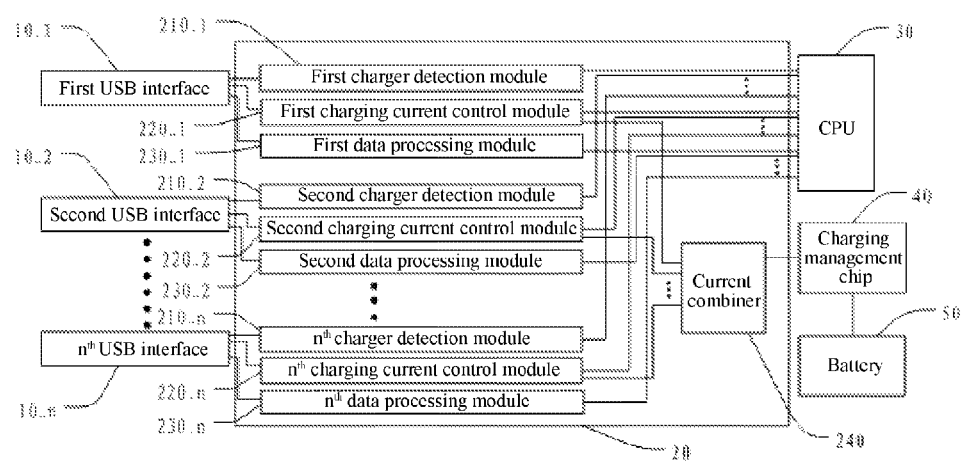
FIG. 3 depicts a structural block diagram of a first preferred embodiment of a mobile terminal with a multi-port charging control function according to the present invention.

During one implementation, at least one USB interface may be provided, and a number of the charger detection modules, a number of the charging current control modules and a number of the data processing modules may be the same as the number of the USB interfaces. Referring to FIG. 3, a structural block diagram of a first embodiment of a mobile terminal, with a multi-port charging control function, is depicted. As shown in FIG. 2, a number of USB interfaces may be n (n is a positive integer), which may be a first USB interface 10_1, a second USB interface 10_2 . . . , and an $n^{th}$ USB interface 10_n, respectively. A number of charger detection modules may be n correspondingly, which may be a first charger detection module 210_1, a second charger detection module 210_2 . . . , and an $n^{th}$ charger detection module 210_n, respectively. A number of charging current control modules may be n correspondingly, which may be a first charging current control module 220_1, a second charging current control module 220_2 . . . , and an $n^{th}$ charging current control module 220_n, respectively. A number of data processing module may be n correspondingly, which may be a first data processing module 230_1, a second data processing module 230_2 . . . , and an $n^{th}$ data processing module 230_n, respectively.

The first charger detection module 210_1, the first charging current control module 220_1 and the first data processing module 230_1 may be connected to the first USB interface 10_1 and the CPU 30. The second charger detection module 210_2, the second charging current control module 220_2 and the second data processing module 230_2 may be connected to the second USB interface 10_2 and the CPU 30. The rest may be deduced by analogy. The $n^{th}$ charger detection module 210_n, the $n^{th}$ charging current control module 220_n and the $n^{th}$ data processing module 230_n may be connected to the $n^{th}$ USB interface 10_n and the CPU 30. The first charging current control module 220_1, the second charging current control module 220_2 . . . , and the $n^{th}$ charging current control module 220_n may be connected to the current combiner 240.

It should be noted that, circuit structures of the first USB interface 10_1, the second USB interface 10_2 . . . , and the $n^{th}$ USB interface 10_n may be the same as the circuit structure of the USB interface 10 in the implementation shown in FIG. 2. Circuit structures of the first charger detection module 210_1, the second charger detection module 210_2 . . . , and the $n^{th}$ charger detection module 210_n may be the same as the circuit structure of the charger detection module 210 in the implementation shown in FIG. 2. Circuit structures of the first charging current control module 220_1, the second charging current control module 220_2 . . . , and the $n^{th}$ charging current control module 220_n may be the same as the circuit structure of the charging current control module 220 in the implementation shown in FIG. 2. Circuit structures of the first data processing module 230_1, the second data processing module 230_2 . . . , and the $n^{th}$ data processing module 230_n may be the same as the circuit structure of the data processing module 230 in the implementation shown in FIG. 2. While in specific implementations, electronic devices are named differently to distinguish one from another, connection relationships and working principles thereof may be the same.

Figure 4:
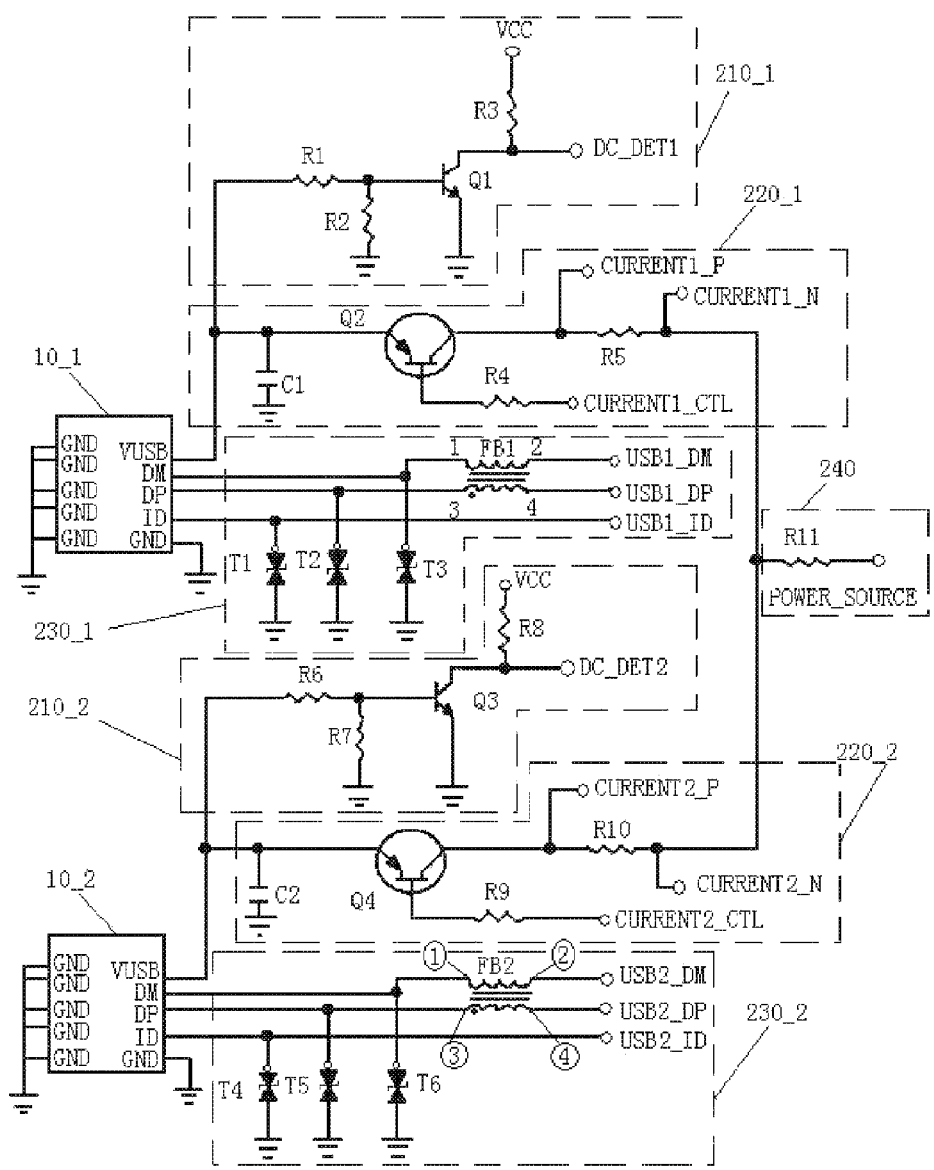
FIG. 4 depicts a circuit diagram of a second preferred embodiment of a mobile terminal with a multi-port charging control function according to the present invention.

A circuit structure and a working principle of the mobile terminal with a multi-port charging control function are specifically illustrated below by using n=2 and chargers may be separately connected to the two USB interfaces as an example. Referring to FIG. 4, a circuit diagram of a second embodiment of a mobile terminal, with a multi-port charging control function, is depicted. A number of USB interfaces may be, for example, two, which may be a first USB interface 10_1 and a second USB interface 10_2, respectively. A charging management module 20 may include a first charger detection module 210_1, a second charger detection module 210_2, a first charging current management module 220_1, a second charging current management module 220_2, a first data processing module 230_1, a second data processing module 230_2 and a current combiner 240. The first charger detection module 210_1, the first charging current control module 220_1 and the first data processing module 230_1 may be connected to the first USB interface 10_1 and the CPU 30. The second charger detection module 210_2, the second charging current control module 220_2 and the second data processing module 230_2 may be connected to the second USB interface 10_2 and the CPU 30; and the first charging current control module 220_1 and the second charging current control module 220_2 may be connected to the current combiner 240.

Circuitry of the first charger detection module 210_1 may be the same as that of the charger detection module 210 in the USB charging management module in the implementation shown in FIG. 2, and may include a first resistor R1, a second resistor R2, a third resistor R3 and a first transistor Q1. Circuitry of the first charging current control module 220_1 may be the same as that of the charging current control module 220 in the USB charging management module in the implementation shown in FIG. 2, and may include a fourth resistor R4, a fifth resistor R5, a second transistor Q2 and a first capacitor C1. Circuitry of the first data processing module 230_1 may be the same as that of the data processing module 230 in the USB charging management module in the implementation shown in FIG. 2, and may include a first common-mode suppression coil FB1, a first TVS tube T1, a second TVS tube T2 and a third TVS tube T3. The second charger detection module 210_2 may include a sixth resistor R6, a seventh resistor R7, an eighth resistor R8 and a third transistor Q3. The second charging current control module 220_2 may include a ninth resistor R9, a tenth resistor R10, a fourth transistor Q4 and a second capacitor C2. The second data processing module 230_2 may include a second common-mode suppression coil FB2, a fourth TVS tube T4, a fifth TVS tube T5 and a sixth TVS tube T6. The current combiner 240 may include an eleventh resistor R11. The circuit structure of the first charger detection module 210_1 may be the same as that of the second charger detection module 210_2; names of the electronic devices may be modified correspondingly to distinguish one from another, however, connection relationships between the electronic devices and the working principles thereof may be the same. For example, the first resistor R1 and the sixth resistor R6 have different names, which are intended to distinguish electronic devices in two charger detection modules, but in fact, the first resistor R1 and the sixth resistor R6 are equivalent, both of which represent the first resistor R1 in the charger detection module 210 shown in FIG. 2. Situations of other modules can be inferred in the same way.

A base of the first transistor Q1 may be connected to a VUSB end of the first USB interface 10_1 and an emitter of the second transistor Q2 through the first resistor, a base of the first transistor Q1 may be further grounded through the second resistor R2, a collector of the first transistor Q1 may be connected to the CPU 30 and may be further connected to a power source end VCC through the third resistor R3, and an emitter of the first transistor Q1 is grounded. The first transistor Q1 may be an NPN transistor, whose collector may output a DC_DET1 signal to the CPU 30.

An emitter of the second transistor Q2 may be grounded through the first capacitor C1, and a base of the second transistor Q2 may be connected to the CPU 30 through the fourth resistor R4; one end of the fifth resistor R5 may be connected to the CPU 30 and a collector of the second transistor Q2, and another end of the fifth resistor R5 may be connected to the CPU 30 and one end of the eleventh resistor R11. The second transistor Q2 may be a high-power PNP transistor. One end of the fifth resistor R5 may output a CURRENT1_P signal to the CPU 30, and another end of the fifth resistor R5 may output a CURRENT1_N signal to the CPU 30.

A first end 1 of the first common-mode suppression coil FB1 may be connected to a DM end of the first USB interface 10_1 and an anode of the third TVS tube T3, a second end 2 of the first common-mode suppression coil FB1 may be connected to the CPU 30, a third end 3 of the first common-mode suppression coil FB1 may be connected to a DP end of the first USB interface 10_1 and an anode of the second TVS tube T2, and a fourth end 4 of the first common-mode suppression coil FB1 may be connected to the CPU 30; an anode of the first TVS tube T1 may be connected to an ID end of the first USB interface 10_1 and the CPU 30; and a cathode of the first TVS tube T1, a cathode of the second TVS tube T2 and a cathode of the third TVS tube T3 may be grounded. A USB1_DM signal may be transmitted between the second end 2 of the first common-mode suppression coil FB1 and the CPU 30, a USB1_DP signal may be transmitted between the fourth end 4 of the first common-mode suppression coil FB1 and the CPU 30, and a USB1_ID may be transmitted between the ID end of the first USB interface 10_1 and the CPU 30.

A base of the third transistor Q3 may be connected to a VUSB end of the second USB interface 10_2 and an emitter of the fourth transistor Q4 through the sixth resistor R6, a base of the third transistor Q3 may be further grounded through the seventh resistor R7, the collector of the third transistor Q3 may be connected to the CPU 30 and may be further connected to a power source end VCC through the eighth resistor R8, and an emitter of the third transistor Q3 is grounded. The third transistor Q3 may be an NPN transistor, whose collector may output a DC_DET2 signal to the CPU 30.

An emitter of the fourth transistor Q4 may be grounded through the second capacitor C2, and a base of the fourth transistor Q4 may be connected to the CPU 30 through the ninth resistor R9; one end of the tenth resistor R10 may be connected to the CPU 30 and a collector of the fourth transistor Q4, and the other end of the tenth resistor R10 is connected to the CPU 30 and one end of the eleventh resistor R11. The fourth transistor Q4 may be a high-power PNP transistor. One end of the tenth resistor R10 may output a CURRENT2_P signal to the CPU 30, and the other end of the tenth resistor R10 may output a CURRENT2_N signal to the CPU 30.

A first end of the second common-mode suppression coil FB2 may be connected to a DM end of the second USB interface 10_2 and the anode of the sixth TVS tube T6, a second end of the second common-mode suppression coil FB2 may be connected to the CPU 30, a third end of the second common-mode suppression coil FB2 is connected to a DP end of the second USB interface 102 and the anode of the fifth TVS tube T5, and a fourth end of the second common-mode suppression coil FB2 may be connected to the CPU 30; the anode of the fourth TVS tube T4 may be connected to an ID end of the second USB interface 10_2 and the CPU 30; and the cathode of the fourth TVS tube T4, the cathode of the fifth TVS tube T5 and the cathode of the sixth TVS tube T6 may be grounded. A USB2_DM signal is transmitted between the second end of the second common-mode suppression coil FB2 and the CPU 30, a USB2_DP signal may be transmitted between the fourth end of the second common-mode suppression coil FB2 and the CPU 30, and a USB2_ID signal may be transmitted between the ID end of the second USB interface 10_2 and the CPU 30.

Assuming that chargers are separately connected to the first USB interface 10_1 and the second USB interface 10_2, the VUSB end of the first USB interface 10_1 and the VUSB end of the second USB interface 10_2, both may output a voltage of 5V, to turn on the first transistor Q1 and the third transistor Q3 separately, and may change the DC_DET1 signal and the DC_DET2 to be low-level signals, which may be transmitted to the CPU 30. The CPU 30 may identify that chargers are separately connected to the first USB interface 10_1 and the second USB interface 10_2, and at this time, the CPU 30 may output a low-level CURRENT1_CTL which may be input to the base of the second transistor Q2 through the fourth resistor R4, and a low-level CURRENT2_CTL which may be input to the base of the fourth transistor Q4 through the ninth resistor R9. The second transistor Q2 and the fourth transistor Q4 may be both turned on; the VUSB end of the first USB interface 10_1 may output a current flowing through the fifth resistor R5. Thereby, a charging current 1 is generated flowing to one end of the current combining resistor R11. Meanwhile, the VUSB end of the second USB interface 10_2 may also output a current flowing through the tenth resistor R10, thereby generating a charging current 2 flowing to one end of the current combining resistor R11. The current combining resistor R11 may combine the charging current 1 and the charging current 2 which may then flow out from the other end of the current combining resistor R11, to form a total charging current POWER_SOURCE to the charging management chip 40 to charge the battery 50. During charging, the CPU 30 may calculate the value of the charging current 1 according to a voltage difference between the CURRENT1_P signal output by one end of the fifth resistor R5 and the CURRENT1_N signal output by the other end of the fifth resistor R5, and a resistance value of the fifth resistor R5. Likewise, the CPU 30 may calculate the value of the charging current 2 according to a voltage difference between the CURRENT2_P signal output by one end of the tenth resistor R10 and the CURRENT2_N signal output by the other end of the tenth resistor R10 and a resistance value of the tenth resistor R10. The charging current 1 and the charging current 2 may be generally maintained at 500 mA. The charging current 1 and the charging current 2 may form a total charging current of 1000 mA after being combined through the current combining resistor R11, so as to charge the battery 50, and charging time of a large-capacity battery may be maintained or shortened by increasing a charging current. In addition, the CPU 30 can further output a CURRENT1_CTL signal and a CURRENT2_CTL signal with corresponding level values to adjust the values of the charging current 1 and the charging current 2. During specific implementation, the CPU 30 can arbitrarily adjust a value of a charging current provided by any one or more USB interfaces.

It should be understood that, each USB interface may be independent, and can provide a nominal current of 500 mA. A charger can provide a nominal current when connected to any USB interface. The total charging current may be the sum of nominal currents of multiple USB interfaces to which chargers are connected, equivalent to parallel charging of the multiple USB interfaces. Regardless of a type of a USB interface, charging can be achieved as long as a charger is connected to the USB interface, and large-current charging can be performed when multiple chargers are connected to USB interfaces, thereby improving compatibility of the USB interfaces.

A charger detection module may detect whether a charger is connected, and may output a detection result (i.e., a low-level DC_DET signal) to notify the CPU when the charger is connected. The CPU may identify that the charger is connected to the USB interface, may output an on command (i.e., a low-level CURRENT_CTL signal) to turn on a charging channel in the charging current control module to generate a charging current. When chargers are connected to multiple USB interfaces, charging channels in multiple corresponding charging current control modules may be turned on to generate multiple charging currents, and the charging currents may enter the current combiner, and may be combined to form a total charging current, which may be transmitted to the charging management chip to charge the battery. A requirement for large-current charging may be achieved by using multiple USB interfaces in parallel for charging, which may significantly reduce charging time of the battery, may be easy to operate, and may have a low cost.

It should be understood that, persons of ordinary skill in the art can make equivalent replacements or variations according to the technical solutions and inventive concepts of the present disclosure. All the variations or replacements shall fall with the scope of the appended claims.

What is claimed is:

1. A mobile terminal, comprising:
   a universal serial bus (USB) charging management module;
   a plurality of USB interfaces connected to the USB charging management module;
   a central processing unit (CPU) connected to the USB charging management module;
   a charging management chip connected to the USB charging management module; and
   a battery connected to the charging management chip,
   where the USB charging management module is to:
      output, to the CPU, a plurality of detection voltages, each detection voltage, of the plurality of detection voltages, corresponding to a charger connection condition of a corresponding USB interface of the plurality of USB interfaces;
      receive an on/off command from the CPU to turn on or turn off a charging channel of the corresponding USB interface, of the plurality of USB interfaces, based on the charger connection condition of the corresponding USB interface, where if the charging channel is turned on, the USB charging management module further is to:
         control a value of a charging current to the charging channel based on an adjustment signal sent by the CPU,
         combine the charging currents of the turned-on charging channels of the plurality of USB interfaces to form a total charging current, and
         transmit the total charging current to the charging management chip to charge the battery.

2. The mobile terminal according to claim 1, where the USB charging management module comprises:
   a plurality of charger detection modules, each charger detection module to detect a charger connected to the corresponding USB interface, and to output a corresponding detection voltage to the CPU;
   a plurality of charging current control modules, each charging current control module to turn on or turn off the charging channel of the corresponding USB interface based on the on/off command, and to control the value of the charging current based on the adjustment signal;
   a plurality of data processing modules, each data processing module to perform anti-interference and anti-static processing on USB data transmitted by the CPU; and
   a current combiner to combine the charging currents of the turned-on charging channels of the plurality of USB interfaces to form the total charging current, and to transmit the total charging current to the charging management chip,
   where the plurality of charger detection modules, the plurality of charging current control modules, and the plurality of data processing modules are connected to the USB interface and the CPU, and the plurality of charging current control modules are connected to the charging management chip through the current combiner.

3. The mobile terminal according to claim 2, where each first charger detection module, of the plurality of charger detection modules, comprises a first resistor, a second resistor, and a third resistor, each connected to a first transistor,
   where each charging current control module, of the plurality of charging current control modules, comprises a fourth resistor, a fifth resistor, and a first capacitor, each connected to a second transistor, and
   where each data processing module, of the plurality of data processing modules comprises a common-mode suppression coil, a first transient voltage suppressor (TVS) tube, a second TVS tube, and a third TVS tube.

4. The mobile terminal according to claim 3, where:
   a base of the first transistor is connected, via the first resistor, to a power source end of the corresponding USB interface and to an emitter of the second transistor, the base of the first transistor is grounded through the second resistor, a collector of the first transistor is connected to the CPU and is connected to a power source through the third resistor, an emitter of the first transistor is grounded, an emitter of the second transistor is connected to the power source end of the corresponding USB interface, the emitter of the second transistor is grounded through the first capacitor, a base of the second transistor is connected to the CPU through the fourth resistor, a first end of the common-mode suppression coil is connected to a positive data line end of the corresponding USB interface and to an anode of the third TVS tube, a second end of the common-mode suppression coil is connected to the CPU, a third end of the common-mode suppression coil is connected to a negative data line end of the corresponding USB interface and to an anode of the second TVS tube, a fourth end of the common-mode suppression coil is connected to the CPU, an anode of the first TVS tube is connected to an identification end of the corresponding USB interface and to the CPU, and a cathode of the first TVS tube, a cathode of the second TVS tube, and a cathode of the third TVS tube are connected to ground.

5. The mobile terminal according to claim 3, where one end of the fifth resistor is connected to the CPU and to a collector of the second transistor, and the other end of the fifth resistor is connected to the CPU and the current combiner.

6. A mobile terminal, comprising:
a battery connected to a USB charging management module through a charging management chip;
a central processing unit (CPU) connected to the USB charging management module; and
a plurality of universal serial bus (USB) interfaces connected to the USB charging management module;
where the CPU is configured to:
identify the charger connection conditions of the plurality of USB interfaces based on a plurality of detection voltages, received from the USB charging management module, each detection voltage corresponding to a USB interface of the plurality of USB interfaces,
output an on/off command to cause the USB charging management module to turn or to turn off a charging channel of a corresponding USB interface, of the plurality of USB interfaces,
acquire, from the USB charging management module, a value of a charging current to the charging channel, and
output an adjustment signal to the USB charging management module to control the value of the charging current based on the adjustment signal,
where the USB charging management module is configured to:
combine the charging currents of the turned-on charging channels of the plurality of USB interfaces, and
transmit, via a charging management chip, a combined charging current to charge the battery.

7. The mobile terminal according to claim 6, wherein the USB charging management module comprises:

a plurality of charger detection modules, each charger detection module to detect whether a charger is connected to the corresponding USB interface, and to output a corresponding detection voltage to the CPU;

a plurality of charging current control modules, each charging current control module to turn on or turn off the charging channel of the corresponding USB interface based on the on/off command, and to control the value of the charging current based on the adjustment signal;

a plurality of data processing modules, each data processing module to perform anti-interference and anti-static processing on USB data transmitted by the CPU; and a current combiner to combine the charging currents of the turned-on charging channels of the plurality of USB interfaces to form the combined charging current, and to transmit the combined charging current to the charging management chip.

8. A method of charging a mobile terminal, the method comprising:
connecting a plurality of charging devices to a corresponding plurality of USB interfaces of a mobile device, the plurality of USB interfaces being connected to a USB charging management module of the mobile device;
outputting, via the USB charging management module and to a CPU of the mobile terminal, a plurality of detection voltages, each detection voltage, of the plurality of detection voltages, corresponding to a charger connection condition of a corresponding USB interface of the plurality of USB interfaces;
receiving, via the USB charging management module, an on/off command from the CPU to turn on or turn off a charging channel of the corresponding USB interface, of the plurality of USB interfaces, based on the charger connection condition of the corresponding USB interface, where if the charging channel is turned on, the method further comprises:
controlling, via the USB charging management module, a value of a charging current to the charging channel based on an adjustment signal sent by the CPU,
combining, via the USB charging management module, the charging currents of the turned-on charging channels of the plurality of USB interfaces, and
transmitting, via the USB charging management module, a combined charging current to a charging management chip of the mobile device to charge a battery of the mobile device.

9. The mobile terminal according to claim 7, where the plurality of charger detection modules, the plurality of charging current control modules, and the plurality of data processing modules are connected to the USB interface and the CPU, and the plurality of charging current control modules are connected to the charging management chip through the current combiner.

10. The mobile terminal according to claim 7, where each charger detection module, of the plurality of charger detection modules, comprises a first resistor, a second resistor, and a third resistor, each connected to a first transistor,
wherein each charging current control module, of the plurality of charging current control modules, comprises a fourth resistor, a fifth resistor, and a first capacitor, each connected to a second transistor, and
wherein each data processing module, of the plurality of data processing modules comprises a common-mode suppression coil, a first transient voltage suppressor (TVS) tube, a second TVS tube, and a third TVS tube.

11. The mobile terminal according to claim 10, where:
a base of the first transistor is connected, via the first resistor, to a power source end of the corresponding USB interface and to an emitter of the second transistor through the first resistor,
the base of the first transistor is grounded through the second resistor,
a collector of the first transistor is connected to the CPU and is connected to a power source through the third resistor,
an emitter of the first transistor is grounded,
an emitter of the second transistor is connected to the power source end of the corresponding USB interface,
the emitter of the second transistor is grounded through the first capacitor, and
a base of the second transistor is connected to the CPU through the fourth resistor.

12. The mobile terminal according to claim 10, where:
a first end of the common-mode suppression coil is connected to a positive data line end of the corresponding USB interface and to an anode of the third TVS tube,
a second end of the common-mode suppression coil is connected to the CPU,
a third end of the common-mode suppression coil is connected to a negative data line end of the corresponding USB interface and to an anode of the second TVS tube,
a fourth end of the common-mode suppression coil is connected to the CPU,
an anode of the first TVS tube is connected to an identification end of the corresponding USB interface and to the CPU, and
a cathode of the first TVS tube, a cathode of the second TVS tube and a cathode of the third TVS tube are connected to ground.

13. The mobile terminal according to claim 10, where the first transistor is an NPN transistor.

14. The mobile terminal according to claim 10, where the second transistor is a PNP transistor.

15. The mobile terminal according to claim 10, where
one end of the fifth resistor is connected to the CPU and to a collector of the second transistor, and the other end of the fifth resistor is connected to the CPU and the current combiner.

16. The method of claim 8, further comprising:
detecting, via each charger detection module of a plurality of charger detection modules, whether a charger is connected to the corresponding USB interface;
outputting, via each charger detection module, a corresponding detection voltage to the CPU;
turning on or turning off, via each charging current control module of a plurality of charging current control modules, the charging channel of the corresponding USB interface based on the on/off command;
controlling, via each charging current control module, the value of the charging current based on the adjustment signal; and
performing, via each data processing module of a plurality of data processing modules, anti-interference and anti-static processing on USB data transmitted by the CPU, and
where the combining the charging currents and the transmitting the combined charging current further comprises:
combining, via current combiner, the charging currents of the turned-on charging channels of the plurality of USB interfaces to form the total charging current, and
transmitting, via the current combiner, the combined charging current to the charging management chip.

* * * * *